United States Patent [19]

Simpson et al.

[11] Patent Number: 4,640,645
[45] Date of Patent: Feb. 3, 1987

[54] CONTAINMENT BOOM SYSTEM

[75] Inventors: Wayne F. Simpson, Achorage, Alaska; Ray R. Ayers; Robert W. Patterson, both of Houston, Tex.

[73] Assignee: Shell Oil Company, Houston, Tex.

[21] Appl. No.: 779,137

[22] Filed: Sep. 23, 1985

[51] Int. Cl.$^4$ .............................................. E02B 15/04
[52] U.S. Cl. ...................................... 405/63; 210/923
[58] Field of Search ................................. 405/63–72; 210/923

[56] References Cited

U.S. PATENT DOCUMENTS

| | | | |
|---|---|---|---|
| 3,533,240 | 10/1970 | Lesh | 405/70 X |
| 3,590,584 | 7/1971 | Fitzgerald | 210/923 X |
| 3,641,770 | 2/1972 | Fitzgerald | 405/68 X |
| 3,650,406 | 3/1972 | Brown et al. | 210/923 |
| 3,852,965 | 12/1974 | Rudd | 405/72 |
| 3,886,750 | 6/1975 | Ayers et al. | 405/72 |
| 4,096,700 | 6/1978 | Muramatsu et al. | 405/63 |

FOREIGN PATENT DOCUMENTS

| | | | |
|---|---|---|---|
| 3012784 | 10/1981 | Fed. Rep. of Germany | 405/63 |
| 0068417 | 4/1984 | Japan | 405/63 |
| 1403611 | 8/1975 | United Kingdom | 405/64 |

Primary Examiner—Dennis L. Taylor

[57] ABSTRACT

An oil containment boom system of two parallel, spaced-apart booms, with the forward boom designed to permit splashover of oil, a low pressure area between the booms functioning to retain the splashover oil.

4 Claims, 3 Drawing Figures

CONTAINMENT BOOM SYSTEM

BACKGROUND OF THE INVENTION

This invention relates to a method and apparatus for skimming and containment of a floating liquid pollutant such as oil on a body of water.

The most effective way of containment and removal of a liquid pollutant which is spilled on a body of water and which floats on the surface thereof, has been to use floating barriers, commonly referred to as booms, to confine the pollutant to a collection area. Such booms generally are floating, elongated mechanical devices used to divert or stop the flow of the floating liquid pollutant. Booms presently on the market suffer from several failure mechanisms. One major failure mechanism pertains to underflow caused by currents or waves which carry the pollutant under the booms. Another failure mechanism, splashover, is caused by waves and carries the pollutant over the boom and outside the collection area. Other modes of failure include mechanical failures of structural members and joints and losses occasioned by improper anchoring and positioning of the booms.

For the most part, booms are classifiable into containment devices and diversionary devices. Both types of booms can be anchored in a body of water or towed through a body of water, but both become ineffective in controlling the movement of pollutants when the relative velocity of the water with respect to the booms exceeds approximately 1 knot for containment devices and 2 knots for diversionary devices. Currents in excess of 1 or 2 knots are frequently experienced, and accordingly, the need for a pollution collection device which will be effective in currents in excess of 2 knots is manifest.

Applicants are not aware of any prior art references which, in their judgment as one skilled in the boom art, would anticipate or render obvious the novel boom arrangement of the present invention; however, for the purposes of fully developing the background of the invention and establishing the state of the requisite art, the following are set forth: U.S. Pat. Nos. 3,650,406; 3,886,750 and 4,096,700.

SUMMARY OF THE INVENTION

It is a primary purpose of the present invention to provide a method and apparatus which solve the above noted problems of the prior art and which can be utilized to contain, control and remove oil from the surface of a body of water. Accordingly, the present invention provides a method, and means for conducting the method, for containing a floating liquid pollutant on a water surface, comprising: providing at least two spaced-apart booms, one boom having a lower above-water profile than the other boom; and allowing pollutant to splash over the lower profile boom and be captured in a containment area between the two booms. The lower profile boom is provided with a skirt having sufficient draft to create a low pressure region between the two booms, and the higher profile boom is provided with a skirt having sufficient draft to prevent pollutant underflow.

Other purposes, advantages and features of the invention will be apparent to one skilled in the art upon review of the following.

DESCRIPTION OF PREFERRED EMBODIMENTS

Figure 1:
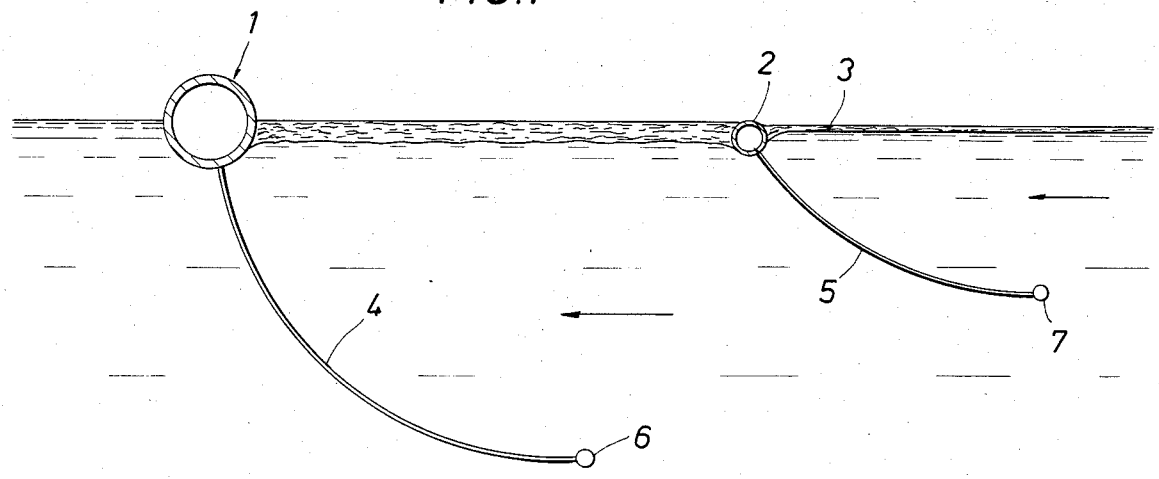
FIG. 1 is a cross section of the boom system taken along lines 1—1 of FIG. 2.

In the present invention of an improved oil containment boom, knowledge of the known failure modes of booms is utilized to design a boom system which has an improved capability.

As above mentioned, the two major failure modes of containment booms are oil underflow (in currents) and wave splashover. When oil escapes past a boom, some of it is retained on the surface of the water, sheltered in the low fluid-pressure region just downcurrent of the boom. If two booms are deployed in parallel where their flow fields are coupled, a low pressure region is formed in the region between the booms. Further, oil can be retained in currents above that possible if only one boom were used. The problem, however, is that if oil is lost under the first boom, it will not normally rise in time to be captured between the two booms. In fact, it will normally pass beneath both booms. If, however, oil is caused to splash over the first boom, it will normally be retained between the two booms.

A principal feature of the present invention resides in designing the forward boom to intentionally fail in the splashover mode. More specifically, the flotation size is small enough in relation to the boom skirt draft to cause splashover of a bottom-tension boom, but the forward boom skirt is sufficient in length to create the low pressure region behind it. Further, the proportions of the aft boom are matched with those of the forward boom to afford maximum oil containment of the system thus formed.

Other multiple booms can be configured in accordance with the present invention to improve the wave/current oil containment capacity of such a boom system. The configuration of the parallel booms is chosen in a way to induce flow of oil to a central containment area for optimum burning or mechanical removal.

Having thus generally described the invention, the following is a more detailed description given in accordance with specific reference to the drawings. In its broadest form, the present invention provides a downstream buoyant member 1 and an upstream buoyant member 2 wherein the downstream buoyant member is significantly larger than the upstream buoyant member which is designed to fail in the splashover mode so that pollutant 3 upstream of float 2 splashes over and is trapped between floats 1 and 2. The buoyant members 1 and 2 are not confined to single, integral members nor are they confined to cross sections of an oval or cylindrical nature. In fact, it may be particularly useful to provide a number of discrete buoyant sections connected in a longitudinal arrangement for ease of handling and placement and increased utility. The cross sectional shape of the buoyant float may be any shape whatsoever, so long as the requisite buoyancy is maintained and the member projects a sufficient distance above the water surface to confine the pollutant, in the case of downstream buoyant member 1, and in the case of upstream buoyant member 2 is sufficiently low to allow splashover of the pollutant 3. Thus, the upstream buoyant member cross section may likewise take any of various shapes, such as circular, oval, triangular or square, so long as the buoyancy allows the member to project above the water surface the requisite distance but not so far above as to prevent splashover of the pollutant.

Depending below floats 1 and 2, respectively, are skirts 4 and 5. In the embodiment of FIG. 1 skirt 4 is substantially longer than skirt 5. This is so that any underflow of pollutant is definitely prohibited from passing beneath skirt 4. In addition, float 2, being of smaller size than float 1, may not be capable of supporting as large a skirt as float 1. However, it is required that skirt 5 be of sufficient draft in order to form a low pressure region to be formed between the booms. At the bottoms of skirts 4 and 5, or thereabouts, tensioning means 6 and 7 are provided which may be a cable, chain or the like. While the booms are not necessarily bottom-tensioned, it has been found that such tensioning is the most efficient way to utilize the booms. The skirts may be of any flexible material which is impermeable to the water and the liquid pollutant being collected.

Figure 2:
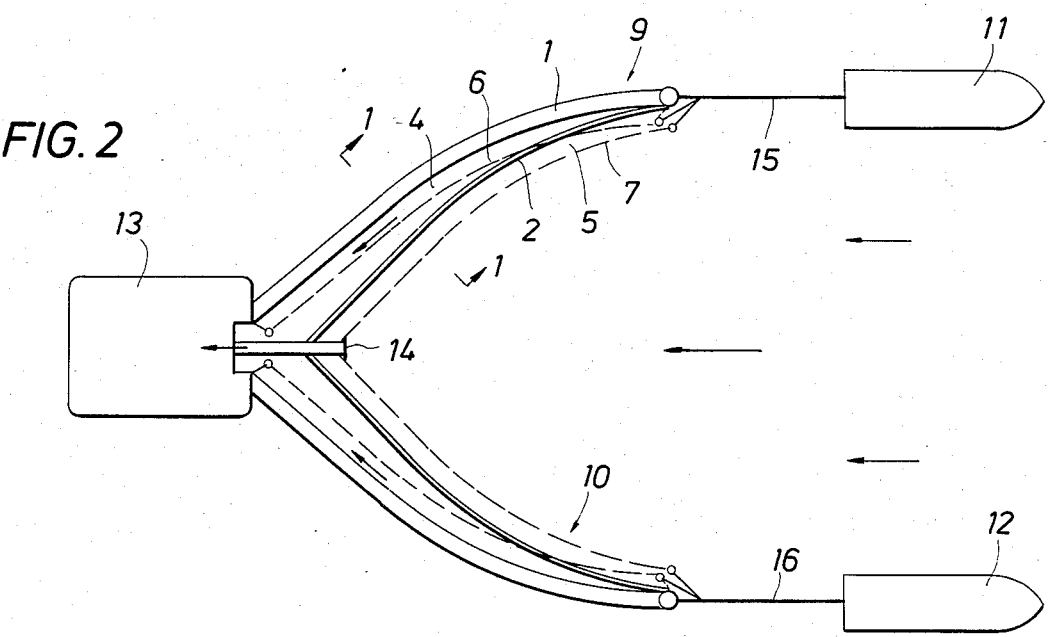
FIG. 2 provides an embodiment of the invention for towing by vessels.

Referring now to FIG. 2, a V-shaped arrangement of booms 9 and 10, are towed by vessels 11 and 12, and the booms are connected at their opposite ends to a barge 13 into which pollutant is funneled from booms 9 and 10. The skirts for each boom are shown in phantom by the dotted lines. A structural member 14 extends forward of the barge 13 and the booms 9 and 10 and their depending skirts are attached at one end to the structural member. At the other end, the booms and skirts are respectively attached to vessels 11 and 12 by connection means 15 and 16, which include means for attaching the bottom-tensioned skirts as well.

Figure 3:
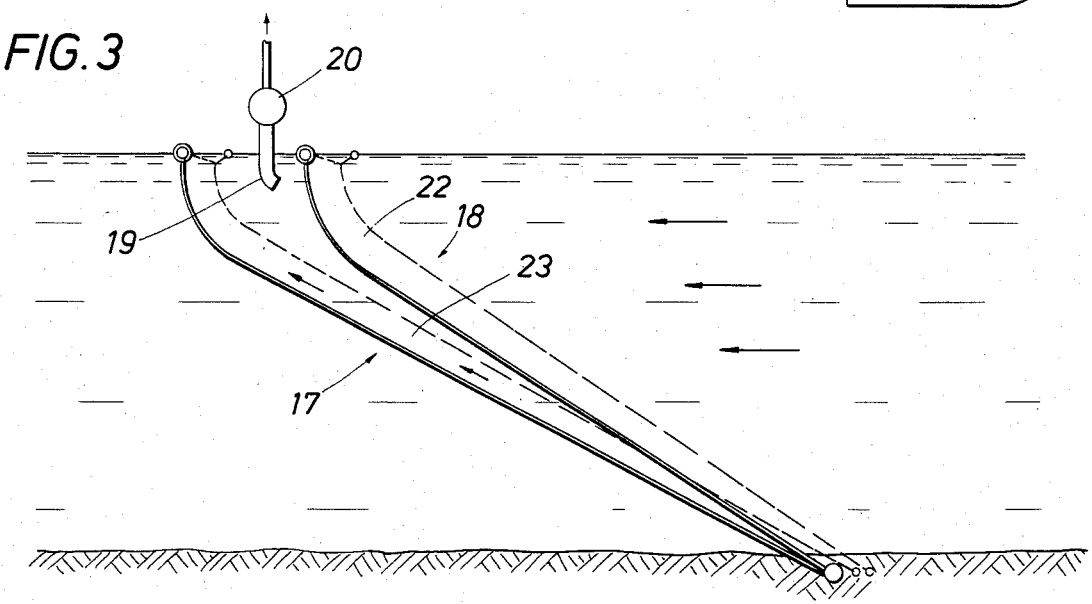
FIG. 3 represents another embodiment of the invention for use in a stream.

In FIG. 3 there is shown another embodiment wherein a V-shaped arrangement of booms 17 and 18 extends at an angle across a flowing stream. The pollutant is allowed to pass over the forward boom 18 and then becomes trapped between the booms and passes in the direction of the arrows to a collection area. At the collection area a suction pipe 19 and associated pump 20 move the collected pollutant to storage or other disposal means. The booms 18 and 19 preferably have depending skirts 22 and 23 (shown in phantom) and are separately attached at opposite ends to the respective shorelines.

The foregoing description of the invention is merely intended to be explanatory thereof. Various changes in the details of the described apparatus may be made within the scope of the appended claims without departing from the spirit of the invention.

What is claimed is:

1. A method for containing a floating liquid pollutant upon a water surface, comprising:
   providing at least two spaced-apart booms, one boom having a lower above-water profile than other boom;
   allowing pollutant to splash over the lower profile boom and be captured in a containment area between the two booms;
   providing the lower profile boom with a skirt having sufficient draft to create a low pressure region between the two booms; and
   providing the higher profile boom with a skirt having sufficient draft to prevent pollutant from escaping thereunder.

2. The method of claim 1 including tensioning the two booms by tensioning means attached at least near the bottoms of the skirts.

3. An apparatus for containing a floating liquid pollutant on a water surface, comprising:
   at least two spaced-apart booms, one boom having a lower above-water profile than the other boom;
   the lower profile boom having flotation means extending at least partly above-water and a skirt having sufficient draft to create a low pressure region between the two booms; and
   tensioning means located at near the bottom of the skirt, the size of the flotation means being small enough in relation to the skirt draft to cause splashover with bottom tensioning.

4. The apparatus of claim 3 wherein the higher profile boom has a skirt having sufficient draft to prevent pollutant from escaping thereunder and tensioning means attached at least near the bottom of the skirt.

* * * * *